Oct. 23, 1956

K. L. ELLILA 2,767,852

FILTER APPARATUS

Original Filed May 13, 1952

INVENTOR:
Karl Lauri Ellila
BY: Michael S. Striker
agt.

United States Patent Office 2,767,852
Patented Oct. 23, 1956

2,767,852
FILTER APPARATUS

Karl Lauri Ellila, Helsinki, Finland

Original application May 13, 1952, Serial No. 287,529, now Patent No. 2,697,520, dated December 21, 1954. Divided and this application June 4, 1953, Serial No. 365,938

Claims priority, application Sweden August 31, 1944

7 Claims. (Cl. 210—171)

This application is a divisional application of my application Serial No. 287,529, filed May 13, 1952, now Patent No. 2,697,520 and dated December 21, 1954, which in turn is a continuation in part of my application Serial No. 674,815, now abandoned, entitled improvement in Sand Filters, filed June 6, 1946.

This invention relates to sand filtering devices as used for water purification purposes and has for its object the provision of an improved method of constructing water and air networks on the bottom of filters of the kind described and nozzles to be coupled therewith, said networks being adapted for discharging from the filter the water flowing downwardly through the sand bed and thereby purified and for passing water and air upwardly through the sand bed to rinse the sand in the filter rinsing process.

Said networks comprise a main duct for water and a second main duct for air sometimes partly or completely embedded in a filter bottom made of concrete, and coupled to said main ducts a plurality of substantially horizontal branch tubes advantageously arranged to slope gently towards said main ducts, and over the whole surface area mutually spaced nozzles to be fixed to the said tubes. Exteriorly of the filter are arranged valves of prior known construction and other means necessary in conducting the filtering and rinsing processes.

Heretofore it has been customary to assemble on a ready cast concrete bottom at least the branch pipes with respective nozzle attachments from tubes or sleeves of iron or even of stainless steel in some instances. Upon adding the necessary sand bed to the filter, the network will come to lie on the filter bottom under cover of sand. As is known, filters of the kind described are generally very large wherefore the network is subjected to high pressure due to the overlying mass of sand and water, said pressure being many times greater than that prevailing within the network. Consequently the network must, of necessity, be made to have thick walls and of strong material which renders the construction expensive. Moreover, the network on the filter bottom hinders changing of sand which is a time consuming operation.

For obviating the said defect it has been proposed to cast the network in the shape of channels made into the bottom concrete itself. This, however, is difficult to accomplish and, moreover, even the slightest fracture in the concrete may permit entry of sand into the network and even lead to the rapid destruction of the whole network and bottom. Besides, it is almost impossible to make the walls of cement channels adequately smooth, and the same cannot even withstand for a longer period of time the effect of pure water but mineral matter will dissolve therefrom into the water and on the surface thereof will develop such deposits which may easily loosen and thus cause contamination of the water and cloggings.

According to the teachings of the present invention the above described defects can be obviated; by means of the invention notable advantages can be obtained which will become apparent from the following specification.

The method according to the present invention for constructing the network of a sand filter comprises assembling and coupling together of the whole bottom network of the filter so as to provide a construction ready in place on the surface and adapted for being covered by the concrete bottom while providing supports for the said network to maintain the same at a distance slightly above said surface, subsequently covering the network with a concrete layer forming the filter bottom, the distance between the said network and the said surface and the thickness of the concrete layer being such that at least the whole branch network in its entirety is under cover of said tightly encircling concrete layer, while providing in the concrete bottom holes necessary for coupling nozzles to the said branch pipes.

It is of importance in the method according to the present invention that the network, primarily the branch network be arranged on such a level that upon subsequently casting the filter bottom of concrete the same will with certainty enter beneath the said pipes and the network thereby become embedded in strong concrete encircling the same tightly on all sides. Thus is obtained a network practically integral with the filter bottom and wherein concrete imparts excellent rigidity to the network, prevents impairment of the pipes and renders immaterial the occurrence of leaks even the absolute necessity of immediately repairing said leaks in heretofore used networks arranged over the filter bottom constituting the reason why it was previously considered impossible to arrange said network underneath the bottom surface. Obviously the pipes can, both externally and internally, be protected against corrosion by application in prior known manner of corrosion proofing materials or coatings.

The method according to the invention provides, moreover, the economically notable advantage that the pipes may be made of thin or otherwise breakable material such as thin metal or stainless steel piping having a wall thickness of 1 mm. or less or of glass and above all of suitable artificial resins or so-called plastic materials, in which instance the networks may be assembled from standardized parts manufactured by ordinary mass production methods while using suitable adhesives or solvents, if any, for joining said parts together in assemblage of the network.

The invention provides still another notable advantage in that according to a preferred embodiment the networks water and air pipes in each network branch can be vertically spaced from each other and separated by a part of said concrete bottom, in which case for interconnecting the nozzles extending into the sand bed overlying said bottom and the said pipes use may be made of a tubular connecting means adapted for being connected with the said tubes and provided with a connection pipe for the nozzle in communication with both of the tubes. The said tubular connection means serves also as extension means with which pipes divided into parts corresponding to the number of nozzles each time desired may be interconnected. The last of the connecting means at the end of each branch is closed in a suitable manner so as to prevent the entry of concrete in casting the bottom.

The aforesaid embodiment of the invention given by way of example only without the invention being limited thereto, will become apparent from the accompanying drawings, wherein—

Figure 1:
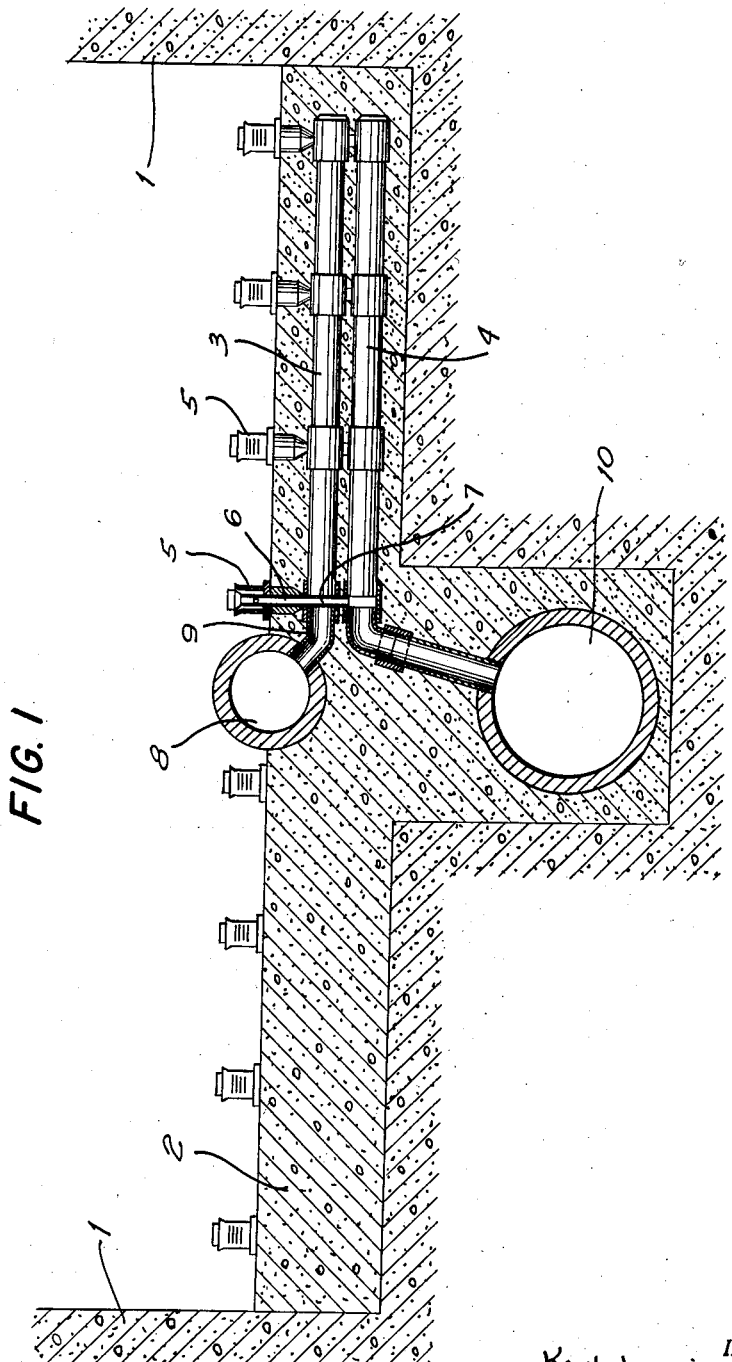
Fig. 1 is a vertical section of a sand filter having a concrete bottom.

Fig. 1 shows only one of the main ducts in the centre of the filter, the network branch extending to the right, while the left side of the figure shows a nozzle of a similar branch farther away from the section surface. It is obvious that the number and length of network branches of the kind described as also the number of nozzles employed will depend upon the size of the filter and that the branches may be arranged either longitudinally of the main ducts in staggered relation, as is assumed in Fig. 1, or as extending from the same points of the main ducts to both sides thereof. The regulating means of the main ducts adapted for setting the filter to operate either for filtering purposes or for rinsing purposes are not included in the drawings because placement thereof depends on the conditions desired each time and because the same are of prior known construction.

As is evident from Fig. 1, the walls 1 of the filter tank or reservoir are concrete as well as the filter bottom 2, wherein ducts 4 for the filtered water and inlet ducts 3 for the rinsing air are encased.

It is taken for granted that here a description of the placing and operation of the nozzles is unnecessary with exception of the following:

Each nozzle 5 is provided with an outlet and inlet pipe 6, which passes through the air duct 3 and opens into the clear water collection pipe 4. The portion of the pipe 6 residing inside duct 3 is provided with opening 7 through which rinsing air passes into pipe 6 and from thence into the nozzles in the filtering bed of sand. The air is conducted into every air duct 3 through a common inlet duct 8, fairly large and preferably placed in the centre of the filter, wherefrom air is pressed during the rinsing period into the ducts 3, on both sides of the duct 8. Only ducts on one side of duct 8 are shown in the drawings. Every duct 3 is joined to the duct 8 by means of a connecting knee 9. As is shown in the drawings ducts 3 and 4 each comprises a plurality of mutually spaced lengths of tubes arranged in straight rows, only one of which is illustrated in the drawing, each pair of tubes being interconnected by a telescoping sleeve located over adjacent ends of each pair of tubes and the pipes 6 respectively extending only through these sleeves.

The filtered water gathers into a common, large duct 10 placed under the air duct 8 and water ducts 4.

Ducts 8 and 10 can naturally be built directly into concrete,

When it is desired to wash the filter, valves or the like are suitably reversed and then the washing water is passed in the known manner through ducts 4 and air through ducts 3 and pipes 6 and nozzles 5 into the bed of sand. The direction of flow is thus reversed.

It should be noted that usually no means are provided for closing the openings 7 in the pipes 6 during the filtering process. Thus, during the filtering process, the filtered water will flow not only into the water ducts 4, but apart therefrom will also flow through the openings 7 into the air ducts 3, partly or entirely filled with the same. This, of course, does not constitute any disadvantage since during the cleaning process the air introduced under pressure through the air ducts 8 will force the water through the openings 7 back into the tubes 6, and through the same and the nozzles 5 back into the filter chamber.

It is obvious that the height of the abovedescribed network construction with superposed ducts 3 and 4 is relatively large. If the network is arranged over a filter bottom it may, therefore easily become damaged. In addition it would greatly hamper the complete cleansing of sand in the rinsing stage and especially impede changing of sand. When it is embedded in the concrete bottom according to the invention and completely encircled by concrete these disadvantages can be obviated. This permits the network to be made of thin walled material which would break without the protection of the concrete.

Figure 2:
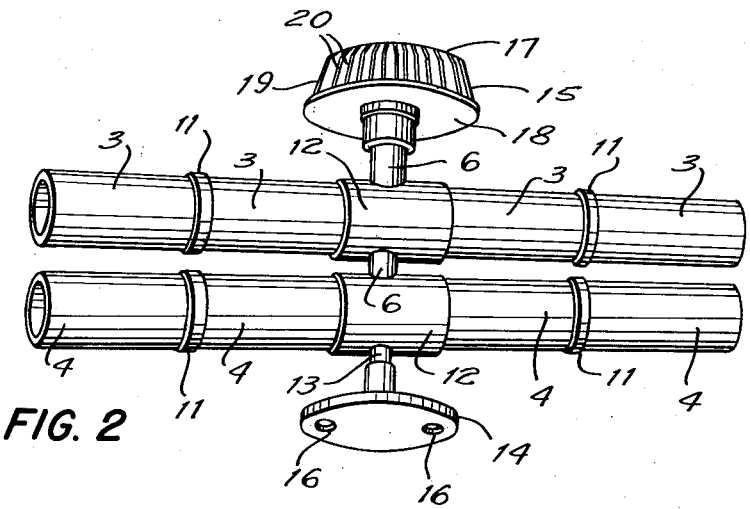
Fig. 2 is a perspective view in enlarged scale of a part of the network branch and nozzle connected to both pipes thereof.

Fig. 2 shows how the water and air ducts are made of standardized lengths of tubes of artificial resin or plastic material manufactured by ordinary mass production methods, having at one end thereof a sleeve 11 into which the sleeveless end of the tube can be telescoped and in assembling the network can be secured in place by means of an adhesive or solvent suitable for the plastic material in question. The sleeve 11 may be so wide as to admit of the adjusting of the network branch length and mutual distance of the nozzles in installing the network. For securing the nozzles 5 use is made of the two-part connecting pipe 6 of nozzle 5 interconnecting the parts joined to the different ducts. The top end thereof is so long that the nozzle 5 fitted thereon will rise above the concrete bottom. The pipe 6 extends through the upper part of the connecting means 12 into the lower part to be secured to the water duct 4 so that water may flow during the filtering process through the nozzle into the last-mentioned duct 4 and therethrough into the main water duct to be led away from the filter. The part of pipe 6 disposed within the upper part of the connecting means 12 has a hole or holes 7 (Fig. 3) through which air may be admitted into the nozzle together with rinsing water passed through the water network. As the connecting means 12 is made symmetrical with the central plane vertical to the plane of Fig. 3, it can be manufactured in prior known manner from two identical halves which are joined to form an integral whole. Depending upon the relative distance desired between the nozzles 5, the desired amount of duct parts 5 are arranged between the connecting means while the open end of the connecting means of the last of nozzles of the network branch is closed by any suitable closing means.

Figure 3:
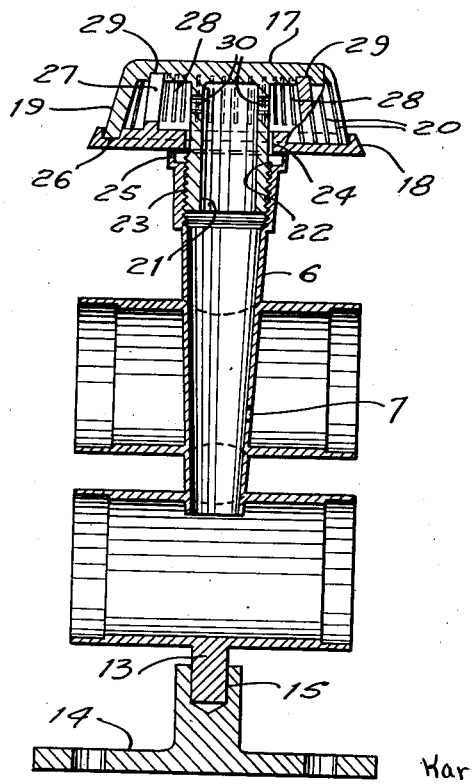
Fig. 3 is a vertical section in enlarged scale of the means for interconnecting water and airducts and simultaneously serving as an extension piece, as also of a nozzle advantageous according to the invention.

Although in the installation of ducts any suitable loose pieces can be used for maintaining the same at an adequately high level, Figs. 2 and 3 show an advantageous supporting structure which can be made for the connecting means 12 and comprises a pin 13 which as such is usable as supporting means but which preferably is made to be fitted into a recess 15 shaped to correspond with the form of the said pin and provided in a stand 14 made specially for the purpose. The stand 14 may be secured to, e. g., wooden lists or the like remaining under cover of the concrete also. For fastening or securing purposes the stand 14 is provided with holes 16. Generally it is unnecessary to provide stands of the kind described for each connecting means.

In Figs. 2 and 3 is also shown a very advantageous form of nozzle structure made preferably of plastic material also. The nozzle has parts 17 and 18 respectively. The part 17 is shaped in the form of a lid having a rim and the annular wall 19 thereof has straining slits 20 extending to the free outer edge of said wall portion and is therefore easy to manufacture. The wall 19 is advantageously slightly conical in shape. A tubular part 21 depends from the middle of the part 17, the lower end of the part 21 being provided with threads 22 by means of which the nozzle is secured to the corresponding threads 23 in the top part of the connecting pipe 6. Then too, the lower nozzle part 18 having a central opening 24 corresponding in shape to the pipe part 21 will be caused to rest on the top part 25 of the pipe 6. On the upper surface of the part 18, adjacent the outer rim thereof is a circular groove 26 adapted to receive the lower edge of the wall 19 when securing the nozzle in place. Between the groove 26 and the opening 24 there is arranged in the part 18 an upwardly turned slightly conical ring 27 having straining slits 28 extending to the upper edge thereof. On securing the nozzle the upper edge of the ring 27 will slip into the annular groove 29 on the internal surface of the part 17, said groove 29 thus corresponding to the groove 26 in the part 18. Thus the nozzle has two telescoping annular straining surfaces 19 and 27 whose outer edges receive support respectively from the grooves 26 and 29.

That part of the tubular piece 21 which, when the nozzle is secured in place, resides within the space formed between the parts 17 and 18 has holes 30 through which the nozzle via the pipe part 21 is in communication with the ducts 3 and 4. It is evident that the above described nozzle may be used in connection with means other than the above described networks and if the pipes are not arranged in superposed relation, for securing the nozzles in place, use can be made of a connecting means, which corresponds to the lower part of the two-piece connecting means 12 shown in Figs. 2 and 3.

Having now particularly described and ascertained the nature of my said invention and in what manner the same is to be performed, I declare that what I claim is:

1. Apparatus of the character described for use in filtering apparatus, comprising, in combination, a base member; a cover member, each of said members having one surface facing a surface of the other member, said surfaces each having at least one annular groove formed therein; a plurality of rings, each of said rings having one edge fixedly mounted on one of said members and its other edge engaging an annular groove in the other of said members, each of said rings further having a plurality of passages through the surface thereof to permit the entrance of filtered material; mounting means attached to one of said members for attachment to said filtering apparatus; and exit means in one of said members for permitting the discharge of said filtered material to said filtering apparatus.

2. Apparatus of the character described for use in filtering apparatus, comprising, in combination, a base member; a cover member, each of said members having one surface facing a surface of the other member, each of said surfaces being formed with at least one annular groove therein and at least one annular projecting portion, the annular edges on each of said projecting portions engaging the annular grooves in the facing surface of the other said member, each of the annular projections having a plurality of passages through the surface thereof to permit the entrance of filtered material; mounting means attached to one of said members for attachment to said filtering apparatus; and exit means in one of said members for permitting the discharge of said filtered material to said filtering apparatus.

3. Apparatus of the character described for use in filtering apparatus, comprising, in combination, a base member; a cover member, each of said members having one surface facing a surface of the other member, each of said surfaces being formed with at least one annular groove therein, one of said members having an annular flange engaging the annular groove in the other said member and the other said member having an annular projecting portion engaging the annular groove of the first said member, said flange and said annular projecting portion having a plurality of passages through the surface thereof to permit the entrance of filtered material; mounting means attached to one of said members for attachment to said filtering apparatus; and exit means in one of said members for permitting the discharge of said filtered material to said filtering apparatus.

4. Apparatus of the character described for use in filtering apparatus, comprising, in combination, a base member; an annular groove formed in the upper surface of said base member, the upper surface of said base member having an annular projecting portion of smaller diameter than said annular groove; a cover member having a lower surface facing the upper surface of said base member, said cover member having an annular flange cooperating with said annular groove in said base member; an annular groove formed in the lower surface of said cover member and engaging said annular projecting portion of said base member, said flange and said projecting portion being perforated to permit the passage of filtered material therethrough; an axially located channel in said base member; mounting means fixedly mounted on the lower surface of said cover member and projecting through said channel in said base member for mounting on said filtering apparatus; and exit means formed in said mounting means for permitting the discharge of the filtered material to said filtering apparatus.

5. Apparatus of the character described for use in filtering apparatus, comprising, in combination, a base member; an annular groove formed in the upper surface of said base member, the upper surface of said base member having an annular projecting portion of smaller diameter than said annular groove; a cover member having a lower surface facing the upper surface of said base member, said cover member having an annular flange cooperating with said annular groove in said base member; an annular groove formed in the lower surface of said cover member and engaging said annular projecting portion of said base member, said flange and said projecting portion being perforated to permit the passage of filtered material therethrough; an axially located channel in said base member; an annular member fixedly mounted on the lower surface of said cover member and projecting through said channel in said base member, said annular member having a threaded portion adapted for threaded engagement with said filtering apparatus; and exit means formed in said annular member for permitting the discharge of the filtered material to said filtering apparatus.

6. Apparatus of the character described for use in filtering apparatus, comprising, in combination, a base member; an annular groove formed in the upper surface of said base member, the upper surface of said base member having an annular projecting portion of smaller diameter than said annular groove, said annular projecting portion being tapered; a cover member having a lower surface facing the upper surface of said base member, said cover member having an annular flange cooperating with said annular groove in said base member; an annular groove formed in the lower surface of said cover member and engaging said annular projecting portion of said base member, said flange and said projecting portion being perforated to permit the passage of filtered material therethrough; an axially located channel in said base member; mounting means fixedly mounted on the lower surface of said cover member and projecting through said channel in said base member for mounting on said filtering apparatus; and exit means formed in said mounting means for permitting the discharge of the filtered material to said filtering apparatus.

7. Apparatus of the character described for use in filtering apparatus, comprising, in combination, a base member; an annular groove formed in the upper surface of said base member, the upper surface of said base member having an annular projecting portion of smaller diameter than said annular groove, the cross-section of said annular projecting portion uniformly decreasing with distance from the base member; a cover member having a lower surface facing the upper surface of said base member, said cover member having an annular flange cooperating with said annular groove in said base member; an annular groove formed in the lower surface of said cover member and engaging said annular projecting portion of said base member, said flange and said projecting portion being perforated to permit the passage of filtered material therethrough; an axially located channel in said base member; mounting means fixedly mounted on the lower surface of said cover member and projecting through said channel in said base member for mounting on said filtering apparatus; and exit means formed in said mounting means for permitting the discharge of the filtered material to said filtering apparatus.

References Cited in the file of this patent

UNITED STATES PATENTS

| | | |
|---|---|---|
| 653,160 | Williamson | July 3, 1900 |
| 1,566,058 | Williamson | Dec. 15, 1925 |
| 2,412,032 | Bill | Dec. 3, 1946 |